Feb. 13, 1968   E. S. BLAKE ETAL   3,369,064
FLUORINE-CONTAINING PHOSPHORAMIDATES
Filed Nov. 23, 1964

INVENTORS:
EDWARD S. BLAKE
RALPH E. De. BRUNNER
JAMES A. WEBSTER
BY
ATTORNEY

United States Patent Office 3,369,064
Patented Feb. 13, 1968

3,369,064
FLUORINE-CONTAINING PHOSPHORAMIDATES
Edward S. Blake, Ralph E. De Brunner, and James A. Webster, Dayton, Ohio, assignors to Monsanto Research Corporation, St. Louis, Mo., a corporation of Delaware
Filed Nov. 23, 1964, Ser. No. 412,990
8 Claims. (Cl. 260—955)

ABSTRACT OF THE DISCLOSURE

Fluorine-containing phosphoramidates of the formula

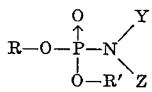

Figure 1:
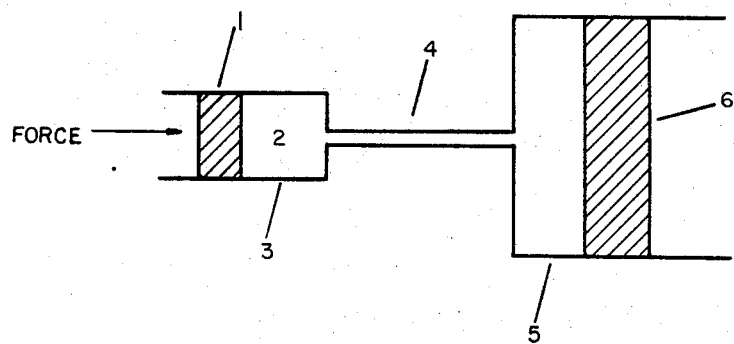

wherein R may be, e.g., trifluoromethylphenyl, R' may be R or halophenyl, Y may be $-(CH_2)_x(CF_2)_yCF_3$ or $-(CH_2)_n$-arylene-$CF_3$ ($x$ being 1–4, $y$ being 0–5 and $n$ being 0–2) and Z may be Y or lower alkyl; said compounds being useful as hydraulic fluids.

---

This invention relates to organic phosphorus amides, and more particularly provides a new and valuable class of fluorine-containing phosphoramidates, the method of preparing the same, functional fluids comprising the new amides and hydraulic pressure devices and methods of actuating the devices by employing said fluids.

According to the invention, the presently provided amides are prepared by the reaction of certain phosphorohalidates with certain secondary amines, substantially according to the scheme:

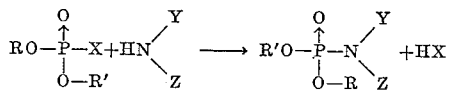

wherein X is halogen having an atomic weight above 34, R is (perfluoroalkyl)phenyl—having from 1 to 3 carbon atoms in the alkyl, R' is selected from the class consisting of R and halophenyl, Y is a fluorine-containing radical selected from the class consisting of the radical

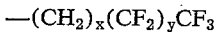

where $x$ is 1 to 4 and $y$ is 0 to 5 and the radical

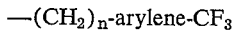

where $n$ is 0 to 2 and the arylene radical is a bivalent benzenoid radical containing 6 to 8 carbon atoms and being linked through nuclear carbon to the remainder of the molecule, and Z is selected from the class consisting of Y and alkyl radicals of from 1 to 4 carbon atoms.

The presently useful halidates may be simple or mixed esters of phosphorochloridic, phosphorobromidic or phosphoriodidic acids such as bis(o-, m- or p-trifluoromethylphenyl) phosphorochloridate or phosphorobromidate, bis (o-, m- or p-perfluoroethylphenyl) phosphorochloridate or phosphoriodidate, bis(o-, m- or p-perfluoropropylphenyl) phosphorochloridate or phosphorobromidate, o-, m- or p-chlorophenyl o-, m- or p-trifluoromethylphenyl phosphorochloridate or phosphorobromidate, o-, m- or p-bromophenyl o-, m- or p-perfluoroethylphenyl phosphorobromidate or phosphorochloridate, o-, m- or p-fluorophenyl o-, m- or p-trifluoromethylphenyl phosphorochloridate or phosphoriodidate, o-, m- or p-iodophenyl o-, m- or p-perfluoropropylphenyl phosphorochloridate or phosphoriodidate, etc. The bis(trifluoromethylphenyl) phosphorochloridates are preferred.

The secondary amine with which the phosphorohalidate is reacted must contain as at least one N-substituent a fluorine-containing radical which may be

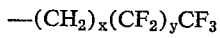

or $(CH_2)_n$-arylene-$CF_3$ wherein $x$ is 1 to 4, $y$ is 0 to 5 and $n$ is 0 to 2. Examples of such radicals are the (perfluoroalkyl)alkyl-radicals, e.g., the 2,2,3,3,4,4,4-heptafluorobutyl- or the 2,2,2-trifluoroethyl radicals; the (trifluoromethyl)-substituted aryl radicals such as the o-, m- or p-trifluoromethylphenyl- or the 2-methyl-3-(trifluoromethyl)phenyl radicals; and aralkyl radicals having a trifluoromethyl radical as an aromatic substituent, e.g., o-, m- or p-trifluoromethylbenzyl or 2-(o-, m- or p-trifluoromethylphenyl)ethyl radical. The other N-substituent may be the same or different fluorine-containing radical, or it may be an alkyl radical. The latter is preferred.

Examples of the presently provided, fluorine-containing phosphoramidates are the bis(o-, m- and p-trifluoromethylphenyl) bis(3,3,3 - trifluoropropyl)phosphoramidates which are obtained from bis(o-, m- and p-trifluoromethylphenyl) phosphorochloridate or phosphorobromidate and bis(3,3,3-trifluoropropyl)amine; the bis(o-, m- and p-perfluoroethylphenyl) N-methyl-N-2,2,3,3,4,4,4-heptabutylphosphoramidates which are obtained from bis(o-, m- or p-trifluoroethylphenyl) phosphorochloridate or phosphoriodidate and N-methyl-2,2,3,3,4,4,4-heptabutylamine; the bis(o-, m- or p-perfluoropropylphenyl) N-ethyl-N-5,5,5-trifluoropentylphosphoramidates which are obtained from bis(o-, m- or p-perfluoropropylphenyl) phosphorochloridate or phosphorobromidate and N-ethyl-5,5,5-trifluoropentylamine; the o-, m- or p-trifluoromethylphenyl o-, m- or p-chlorophenyl N-butyl-N-3,3,4,4,5,5,5-heptafluoropentylphosphoramidates which are obtained from o-, m- or p-trifluoromethylphenyl o-, m- or p-chlorophenyl phosphorochloridate or phosphorobromidate and N-butyl-3,3,4,4,5,5,5-heptafluoropentylamine, the o-, m- or p-perfluoroethylphenyl o-, m- or p-bromophenyl N-methyl-N-5,5,6,6,6-pentafluorohexylphosphoramidates which are obtained from o-, m- or p-perfluoroethylphenyl o-, m- or p-bromophenyl phosphorochloridate or phosphorobromidate and N-methyl-5,5,6,6,6-pentafluorohexylamine; the o-, m- or p-trifluoromethylphenyl o-, m- or p-fluorophenyl N - methyl-5,5,6,6,7,7,8,8,9,9,10,10,10-tridecylfluorodecyl phosphoramidates which are obtained from o-, m- or p-trifluoromethylphenyl o-, m- or p-fluorophenyl phosphorochloridate or phosphoriodidate and N-methyl-5,5,6,6,7,7,8,8,9,9,10,10,10 - tridecylfluorodecylamine; the o-, m- or p-trifluoromethylphenyl o-, m- or p-iodophenyl N-butyl-N-(o-, m- or p-trifluoromethylphenyl)phosphoramidate obtained from o-, m- or p-trifluoromethylphenyl o-, m- or p-iodophenyl phosphorochloridate or phosphoriodidate and N-butyl-α,α,α-trifluoro-o-, m- or p-toluidine; the bis(o- m- or p-trifluoromethylphenyl) N-ethyl-N-(o-, m- or p-trifluoromethylphenyl)phosphoramidates which are obtained from bis(o-, m- or p-trifluoromethylphenyl) phosphorochloridate or phosphorobromidate and N-ethyl-α,α,α-trifluoro-o-, m- or p-toluidine; the bis(o-, m- or p-trifluoromethylphenyl) N-methyl-N-(o-, m- or p-trifluoromethyl)benzylphosphoramidates which are obtained from the same phosphorochloridate or phosphorobromidate and N-methyl-o-, m- or p-(trifluoromethyl)benzylamine; the bis(o-, m- or p-perfluoroethylphenyl) N-propyl-N-(o-, m- or p-trifluoromethyl)benzylphosphoramidates which are obtained from bis(o-, m- or p-perfluoroethylphenyl)phosphorochloridate or phosphorobromidate and N-propyl-o-, m- or p-(trifluoromethyl)benzylamine, the bis(o-, m- or p-perfluoromethylphenyl) N-ethyl-N-2-(o-, m- or p - trifluoromethylphenyl)ethylphosphoramidates which are obtained from bis(o-, m- or p-trifluoromethylphenyl)phosphorochloridate or phosphorobromidate and N-ethyl-N-2-(o-, m- or p-trifluoromethylphenyl)ethylamine; the o-, m- or p-perfluoroethylphenyl o-, m- or p-fluorophenyl N - butyl-N-(3,5-dimethyl-4-trifluoromethylphenyl)phosphoramidates which are obtained from o-, m- or p-perfluoroethylphenyl o-, m- or p-fluorophenyl phosphorochloridate or phosphorobromidate and N-butyl-3,5-dimethyl-4-trifluoromethylaniline, etc. Compounds which are preferred, owing to their outstanding functional fluid utility and easy availability are the phosphoramidates of the structure

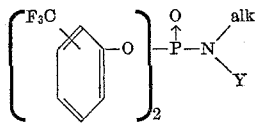

wherein alk denotes an alkyl radical of from 1 to 4 carbon atoms and Y is the hereinbefore defined fluorine-containing radical. The analogous trifluoromethylphenyl halophenyl esters are similarly useful.

Reaction of the phosphorohalidate with the fluorine-containing amine to give the presently provided phosphoramidates proceeds by replacement of the halogen atom of the halidate by the secondary amine radical. The reaction may be conducted in the presence or absence of an inert organic liquid diluent or solvent, which may be, e.g., an aliphatic or aromatic hydrocarbon such as hexane, benzene or xylene, a chlorinated hydrocarbon such as chloroform, carbon tetrachloride or chlorobenzene; an ether such as butyl ether, or tetrahydrofuran; a tertiary amide such as dimethylformamide, etc.

The reaction is generally exothermic; hence, heating is usually not required and the condensation may be conducted by operating at ambient temperatures, or even with cooling. However, heating may be desired to assure complete reaction. Also, when working with the somewhat sluggish benzenoid amines, e.g., N-methyl-p-(2,2,3,3,4,4,4-heptafluorobutyl)aniline or bis-p-($\alpha,\alpha,\alpha$-trifluorotolyl) amine, heating may be used for the purpose of decreasing reaction time. Temperatures of from, say, 0°–75° C. and preferably of from 0° C. to 50° C., are thus useful. When working in the presence of a diluent or solvent, refluxing temperatures of the reaction mixture are conveniently employed to assure completion of the reaction.

Since reaction occurs with production of hydrogen halide, it is conveniently effected in the presence of a basic agent which will serve as hydrogen halide scavenger by forming a solid hydrohalide. Conveniently, an excess of the secondary amine may be used for this purpose. However, it may be any organic or inorganic base which does not react with the phosphorohalidate in preference to the secondary amine, e.g., a tertiary alkylamine such as trimethylamine or tributylamine or heterocyclic nitrogen base such as N-methylmorpholine or pyridine.

One mole of the phosphorohalidate reacts with one mole of the amine to give the present phosphoramidates; hence, the two reactants may be employed in such stoichiometric proportions. However, as above-stated, an excess of the secondary amine may be used for the purpose of serving as scavenger for the by-product hydrogen halide. The resulting hydrohalide is readily removed from the reaction product by filtering or centrifuging, since it is insoluble in most organic solvents and in the reactants. Any excess of the phosphorohalidate or of the amine may be separated by distillation.

All of the reaction variables, i.e., nature of diluent, basic agent, temperature, and reactant proportions can be arrived at readily by easy experimentation. Since reaction is evidenced by change in viscosity and of copious formation of hydrohalide, progress of the reaction can be followed by noting these.

The presently provided fluorine-containing phosphoramidates are stable, well-defined compounds which are generally clear, high-boiling liquids. They generally have a specific viscosity at 25° F. of from 50 to 15,000 centistokes and are particularly useful as functional fluids. The present phosphoramidates are generally liquid over wide temperature ranges, possess high flash points and high ignition points and are characterized by good thermal stability. They generally remain liquid at very low temperatures. Hence they are eminently suited for use as hydraulic fluids, especially in hydraulic systems which are subjected to widely varying temperature conditions. They possess good viscosity/temperature relationships and are also useful, e.g., as heat-exchange media, gyro fluids, and lubricants.

Evaluation of the hydraulic fluid efficacy of the presently provided phosphoramidates is conducted by determining such characteristics as pour point, kinematic viscosity, ASTM slope, autogenous ignition temperature and behavior upon sudden exposure to very high temperatures. The following procedures were used to obtain the data given in the following examples.

The pour point was determined by American Society for Testing Materials (hereinafter referred to as ASTM) procedure D 97–57, except that a small pour point tube, model J–2436 supplied by Scientific Glass Apparatus Company was substituted for the larger tube prescribed in said ASTM procedure. This was done to conserve test material.

Kinematic viscosity was determined by ASTM D 445–T 1961 procedure, using Cannon-Manning Semi-Micro viscometers, calibrated and supplied by the Scientific Development Corporation, State College, Pa.

ASTM slope was determined from the curve plotted from viscosity data on the ASTM viscosity temperature chart (ASTM D 341–39).

The flash points and fire points were determined by ASTM D 92–57 procedure, modified by testing 1 ml. samples.

The autogenous ignition temperature was determined by ASTM D 2155–60T procedure.

Flammability at 1300° F. was determined by visual observation of the behavior of the test material when introduced dropwise at the surface of molten aluminum which is maintained at 1300° F. If no burning resulted, a single spark was applied for a more stringent test of fire resistance.

Fluid-paint compatibility was evaluated as follows: A 4″ by 12″ sheet of a mild steel was sandblasted to a satin finish using 200-mesh alumina. A surface thereof was then coated, using a doctor blade, with a 2 mil wet thickness of a standard alkyd base primer. The coated sheet was dried for 24 hours at 80° F. and 50% relative humidity and a second coat of a standard alkyd base finish was similarly applied and dried on top of the first coat. Four portions (ca. 0.05 ml. each) of the test fluid were placed on the dried finish, covered by watch glasses, and kept at ambient temperature. The effect of the fluid on the finish upon which it had been placed was visually observed after 24 hours.

Figure 2:
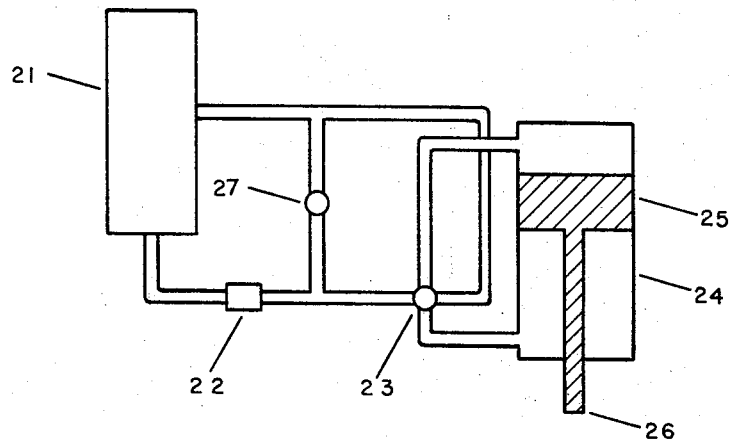

Owing to the excellent physical properties of the present fluorine-containing phosphoramidates, the invention provides improved hydraulic systems wherein said amidates are employed as the operative fluids. Such systems comprise a displaceable member and a displacing force which is transmitted to said member by means of said fluid, as shown in the schematic diagram of FIGURE 1 of the drawings. Here, a displacing force is applied to piston 1 and transmitted through the fluid 2 contained in cylinder 3 whence it travels through line 4 into cylinder 5 where it acts on the displaceable member 6. In such a system, actuation of a moveable member by the presently provided fluid gives performance characteristics which are outstanding because of the physical properties of the fluid. While hydraulic systems will contain such elements as pumps, valves, cylinders and piston, the efficacy of the system necessarily depends upon the fluid, since the fluid must be one which can withstand pressure and remain fluid under the conditions of use. FIGURE 2 of the drawings is a schematic diagram which well illustrates the indispensable role of the fluid in cooperation with other components of a hydraulic system. Here the fluid is stored in reservoir 21, and is pumped therefrom by means of pump 22 and through the directional control valve 23 into either end of cylinder 24, where it acts on piston 25 connected by shaft 26 to a motor (not shown) or other device which converts the hydraulic pressure applied to piston 25 into mechanical energy. Action of the fluid on piston 25 displaces the piston until it reaches the end of its travel. The piston may be caused to travel in either direction by adjustment of the direction valve 23. Valve 23 provides for return of the fluid from the opposite side of the piston, back to reservoir 21. Relief valve 27 is provided to maintain a constant hydraulic pressure within the system. When a predetermined pressure is reached, the fluid will flow back to reservoir 21 by functioning of said relief valve.

Owing to their very good fire-retardant properties, the presently provided fluorine-containing phosphoramidates are particularly useful in hydraulic pressure devices that are employed under conditions wherein any leak or break in the hydraulic system could provide great danger from fire. The exceptionally low pour points of the fluids permit fabrication of pressure devices which are destined for use in extremely cold climates, and their very good vapor pressure characteristics and stability to heat allows use of the same devices in hot environments. The viscosity characteristics and ASTM slopes of the fluids make them of great utility for the transmission of power in a hydraulic system having a pump therein which supplies power for the system, e.g., in a fluid motor comprising a constant- or variable-discharge piston pump which is caused to rotate by the pressure of a hydraulic fluid of the system. The present fluid likewise serves to lubricate moving parts of such hydraulic systems.

For use in a conventional automatic transmission, the presently provided hydraulic fluid is contained in the outer casing of the transmission device, which casing is attached to the usual engine crankshaft and flywheel and rotates therewith. Within the fluid is a coupling comprising an impeller connected to said casing and a turbine which is connected to the drive shaft of the vehicle. The turbine is driven by the motion of the fluid in response to the rotation of the impeller, as the casing to which the impeller is attached is actuated by the crankshaft and flywheel.

The present phosphoramidates are particularly suited for use as the operative fluids in hydraulic braking devices owing to their very good vapor pressure characteristics. Under severe operating conditions heat build-up within the brake system is frequently encountered. Unless the fluid remains liquid at the high temperatures thus developed, the hydraulic brake system becomes inoperable since the vaporized fluid becomes compressible. Although much effort has been expended at providing high boiling hydraulic brake fluids, generally materials which are high boiling congeal at low temperatures.

The presently provided fluids are generally innocuous to the organic coatings and metals which are conventionally used on metals and have no appreciable effect on synthetic rubbers such as buna rubber. The fluids possess very good hydrolytic stability.

The present phosphoramidates are useful as the hydraulic fluids of hydraulic machines, generally, e.g., lifts, hoists, jacks, lock-gates, presses, etc.

The invention is further illustrated by, but not limited to, the following examples.

*Example 1*

A mixture consisting of 587 g. (3.62 moles) of m-trifluoromethylphenol and 261 g. (1.7 moles) of phosphoryl chloride was refluxed for 40 hours with a final temperature of 230° C. Distillation of the resulting reaction mixture gave 517 g. of the substantially pure bis(m-trifluromethylphenyl) phosphorochloridate, B.P. 185–190° C./17 mm.

A 57 g. portion (0.14 mole) of the bis(m-trifluoromethylphenyl) phosphorochloridate which was prepared above was dissolved in about 400 ml. of dry ether in a 4-necked, 1 liter round bottom flask fitted with stirrer, condenser, thermometer, nitrogen inlet tube and dropping funnel. The resulting ether solution was warmed to reflux and a solution of 30 g. (0.14 mole) of N-methyl-2,2,3,3,4,4,4-heptafluorobutylamine in 30 g. (0.16 mole) of tributylamine was added dropwise to the refluxing ether solution in a nitrogen atmosphere. The addition required about 2 hours, and stirring and refluxing were continued for an additional 6 hours. The whole was then allowed to stand at room temperature for about 3 days. The product was isolated as follows: The reaction mixture was poured into ice-dilute hydrochloric acid and the organic phase was separated and washed successively with hydrochloric acid, water, aqueous sodium carbonate solution and finally with water to neutrality. The washed organic phase was dried over sodium sulfate, ether was removed from the dried material, and the residue was distilled to give 61.3 g. (75.3% theoretical yield) of a fraction B.P. 135–138° C./0.25 mm. After filtering this fraction through Attapulgus clay, the filtrate was distilled to give the substantially pure bis(m-trifluoromethylphenyl) N-(2,2,3,3,4,4,4-heptafluorobutyl)-N-methylphosphoramidate, B.P. 112° C./0.015 mm. to 123° C./0.025 mm., $n_D^{25}$ 1.4240, which analyzed as follows:

Calc'd for $C_{19}H_{13}F_{13}NO_3P$: C, 39.26%; H, 2.25%; P, 5.33%. Found: C, 39.08%; H, 2.17%; P, 5.26%.

$P^{31}$, $H^1$ and $F^{19}$ nuclear magnetic resonance analyses confirmed the structure.

The compound was found to have a pour point of −15° F., and the following kinematic viscosities were determined at the temperatures shown below:

| ° F.: | Centistokes |
|---|---|
| 25 | 1507 |
| 100 | 28.05 |
| 210 | 3.09 |

The ASTM slope was 1.02 over the 100–210° F. temperature range.

The autogenous ignition temperature was found to be 1055° F. for 0.07 ml. with a lag of 4 seconds. The compound did not ignite in the 1300° F. molten metal test unless a spark was applied, and then it did not support combustion. The flash point was 392° F. and the fire point was 626° F.

In the paint compatibility test, there was no indication of attack on the paint at the end of 24 hours.

*Example 2*

To a mixture consisting of 64 g. (0.3 mole) of N-methyl-2,2,3,3,4,4,4-heptafluorobutylamine and 65 g. (0.35 mole) of tributylamine in a nitrogen atmosphere there was added, dropwise with vigorous stirring, 121 g. (0.3 mole) of the bis(m-trifluoromethylphenyl) phosphorochloridate which was prepared in Example 1. The reaction was slightly exothermic, the temperature of the mixture rising to about 45° C. during the addition. After warming the whole at 75° C. for a few hours, it was allowed to stand overnight at room temperature. At the end of that time, the reaction mixture was diluted with about 250 ml. of chloroform and then poured into a mixture of crushed ice and hydrochloric acid and the organic phase recovered. After washing the latter successively with ice cold hydrochloric acid, cold water, ice cold aqueous sodium bicarbonate and finally with cold water to neutrality, it was dried over sodium sulfate and filtered. Chloroform was removed from the filtrate by using water aspirator vacuum and the residue was distilled through a 15″ Vigreux column to give 6.3 g. of a fraction B.P. 128–130° C./0.07 mm. and 142.0 g. of a fraction B.P. 130° C./0.07 mm. These were combined and redistilled to give 137.5 g. (78.8% theoretical yield) of the substantially pure bis(m-trifluoromethylphenyl) N-(2,2,3,3,4,4,4-heptafluorobutyl)-N-methylphosphoramidate, B.P. 128° C./0.03 mm., $n_D^{25}$ 1.4240.

Example 3 m-Trifluoromethylphenyl phosphorodichloridate and bis(m-trifluoromethylphenyl) phosphorochloridate were prepared as follows: A mixture consisting of 587 g. (3.62 mole) of m-trifluoromethylphenol and 261 g. (1.7 moles) of phosphoryl chloride was refluxed for 40 hours to a final temperature of 230° C. Distillation of the resulting reaction mixture gave 180 g. of the crude m-trifluoromethylphenyl phosphorodichloridate, B.P. 158–185° C./17 mm. This was then mixed with 539 g. (3.5 mole) of phosphoryl chloride and 1000 g. (6.18 mole) of m-trifluoromethylphenol, and the whole was heated to reflux within a period of 20 hours, at the end of which time the temperature was 230° C. Distillation of the resulting reaction mixture gave 389.5 g. of the substantially pure m-trifluoromethylphenyl phosphorodichloriate, B.P. 125–130° C./20 mm. and 814.2 g. of bis(m-trifluoromethylphenyl)phosphorochloridate, B.P. 195° C./20 mm.

m-Chlorophenyl m-trifluoromethylphenyl phosphorochloridate was prepared by heating under nitrogen, to a temperature of 230° C. during 2 hours, a mixture consisting of 390 g. (1.4 moles) of the m-trifluoromethylphenyl phosphorodichloridate prepared above and 90 g. (0.7 mole) of m-chlorophenol and distilling the resulting reaction mixture to give 195.7 g. of the substantially pure m-chlorophenyl m-trifluoromethylphenyl phosphorochloridate, B.P. 195–198° C./11 mm.

Operating as in Example 1, but using 111 g. (0.3 mole) of the above-prepared m-chlorophenyl m-trifluoromethylphenyl phosphorochloridate instead of the bis(trifluoromethylphenyl) phosphorochloridate which was used in Example 1, there was obtained in the first distillation a product B.P. 136° C./0.1 mm. to 139° C./0.13 mm. Redistillation gave the substantially pure m-chlorophenyl m-trifluoromethylphenyl N-(2,2,3,3,4,4,4-heptafluorobutyl)-N-methylphosphoramidate, B.P. 133° C./0.05 mm., $n_D^{25}$ 1.4500, and analyzing as follows:

Calc'd for $C_{18}H_{13}ClF_{10}NO_3P$: C, 39.47%; H, 2.39%; Cl, 6.47%; P, 5.66%. Found: C, 39.43%; H, 2.47%; Cl, 6.52%; P, 5.37%.

$P^{31}$ and $H^1$ nuclear magnetic resonance analyses gave chemical shifts and patterns which were consistent with the structure.

The compound was found to have a pour point of −10° F. and the following kinematic viscosities at the temperatures shown below.

| ° F.: | Centistokes |
|---|---|
| 25 | 2325 |
| 100 | 34.05 |
| 210 | 3.49 |

The ASTM slope over the 25°–210° F. temperature range was 1.01.

The autogenous ignition temperature was found to be 1080° F. for 0.07 ml. with a lag of 6 seconds. The compound did not ignite in the 1300° F. molten melt test unless a spark was applied, and then it did not support combustion. The flash point was 478° F. and there was no fire at the maximum test temperature of 619° F.

In the paint compatibility test, substantially no attack was evidenced at the end of 24 hours.

Example 4

To 85 g. (0.45 mole) of N-ethyl-α,α,α-trifluoro-m-toluidine in 500 ml. of dry toluene in a nitrogen atmosphere there was gradually added with stirring, 55 g. (0.13 mole) of bis(m-trifluoromethylphenyl) phosphorochloridate which was prepared as in Example 1. There was no evidence of reaction. The reaction mixture was then heated to 110° C. and maintained at this temperature for 5 hours and subsequently allowed to stand at room temperature, still under nitrogen, for several days. It was then filtered to remove the by-product amine hydrochloride, and the filtrate was washed with cold, dilute hydrochloric acid. The organic phase was separated off and washed first with cold water, then with cold, aqueous diluate sodium carbonate and finally again with cold water to neutrality. The washed material was allowed to stratify, giving an aqueous phase, a heavy oil and a light, organic phase. The latter was separated off and the toluene was removed by evaporation to give a residue which was distilled in vacuo to yield 58.4 g. (80.6% theoretical yield) of the substantially pure bis(m-trifluoromethylphenyl) N-ethyl-N-(m-trifluoromethylphenyl) phosphoramidate, B.P. 145°–146° C./0.07 mm. An analytical sample was obtained by filtering it through Attapulgus clay and redistilling to give the purer compound, B.P. 147° C./0.03 mm. $n_D^{25}$ 1.4783, which analyzed as follows:

Calc'd for $C_{23}H_{17}F_9NO_3P$: C, 49.56%; H, 3.08%; P, 5.56%. Found: C, 49.50%; H, 3.20%; P, 5.51%.

$P^{31}$ and $H^1$ nuclear magnetic resonance analyses gave data which confirmed the structure and revealed no impurities.

The compound was found to have the following kinematic viscosities at the temperatures shown below:

| ° F.: | Centistokes |
|---|---|
| 25 | 6146 |
| 100 | 50.36 |
| 210 | 4.21 |

The ASTM slope for the 100–210° F. range was 1.01.

The autogenous ignition temperature was found to be 1100° F. for 0.1 ml. with a lag of 5 seconds. In the molten metal test it did not ignite in the absence of spark, and when a spark was introduced it did not support combustion. The flash point was 480° F. and it did not fire at the maximum test temperature of 695° F.

In the paint compatibility test one of the portions to which the paint had been applied was examined after 24 hours, another at the end of 3 days, still another at the end of 5 days and the last portion at the end of 6 days. In no instances was there any evidence of attack on the paint.

Example 5

To a mixture consisting of 28 g. (0.20 mole) of N-ethyl-α,α,α-trifluoro-m-toluidine and 41 g. (0.22 mole) of tributylamine in a nitrogen atmosphere there was added, dropwise over a three-hour period, 81 g. (0.20 mole) of the bis(m-trifluoromethylphenyl) phosphorochloridate which was prepared in Example 3, while maintaining the temperature of the reaction mixture at about 50° C. The mixture was held at 50–60° C. for an additional 2 hours, and then cooled and diluted with 250 ml. of dry ether. After washing the resulting solution with ice-cold hydrochloric acid, ice cold aqueous potassium carbonate solution and finally with water to neutrality, it was dried over anhydrous sodium sulfate and filtered. Ether was removed from the filtrate by evaporating at room temperature under water pump pressure, and the residue was filtered through alumina and distilled to give a product, B.P. 150–152° C./0.10 mm. Redistillation gave the substantially pure bis(m-trifluoromethylphenyl N-ethyl-N-(m-trifluoromethylphenyl) phosphoramidate, B.P. 146° C./0.025 mm.

Example 6

A pressure vessel which had been charged with 100 g. (0.59 mole) of m-trifluoromethylbenzonitrile, 184 g. (1.80 mole) of acetic anhydride, 0.25 g. of platinum oxide ($PtO_2$), 1 g. of sodium acetate and 30 g. of W-2 Raney nickel catalyst which had been washed twice with ethanol and twice with acetic anhydride, was pressured with hydrogen to 48 p.s.i.g. and shaken for 12 hours. After filtering, the resulting reaction mixture was washed with acetic anhydride and distilled to give a fraction, B.P. 174–175° C./13 mm., M.P. 50.5–53° C., which upon recrystallization from hexane gave the substantially pure N-(3-trifluoromethylbenzyl) acetamide, M.P. 56–57° C., analyzing 55.54% C, 4.80% H and 6.53% N as against 55.3%, 4.64% and 6.45%, the respective calculated values.

A solution of 74 g. (0.8 mole) of the above-prepared N-(3-trifluoromethylbenzyl)acetamide in 1000 ml. of ether was added dropwise during 6 hours to a solution of 61 g. (1.6 moles) of lithium aluminum hydride in 800 ml. of ether and the whole was refluxed for an additional hour. The whole was then allowed to stand for about 2 days. Water (125 ml.) was added dropwise to the cooled (below 15° C.) reaction mixture over a 3-hour period. Addition of 300 ml. of cold, 30% aqueous sodium hydroxide resulted in stratification. Ether was decanted and the residual thick layer was washed several times with ether and subsequently distilled to give 125.9 g. of the substantially pure N-ethyl-m-(trifluoromethyl)benzylamine, B.P. 85° C./13 mm.

To a refluxing solution of 121 g. (0.3 mole) of the bis(m-trifluoromethylphenyl) phosphorochloridate, which was prepared in Example 3, in 800 ml. of dry ether there was added dropwise with stirring, a solution of 61 g. (0.3 mole) of the above-prepared N-ethyl-m-(trifluoromethyl) benzylamine in 74 g. (0.4 mole) of tributylamine. The addition required about 2 hours. Stirring and refluxing were continued for an additional 4 hours. The reaction mixture was then allowed to stand overnight at room temperature. Subsequently, it was filtered to remove by-product amine hydrochloride, and the filtrate was washed successively with ice-cold, dilute hydrochloric acid, water, ice-cold aqueous sodium carbonate solution and finally with water to neutrality. The resulting organic phase was dried over sodium sulfate and the ether was removed therefrom at ambient temperature using a water aspirator. Distillation of the residue gave a fraction B.P. 162° C./0.06 mm. to 167° C./0.10 mm.; it was redistilled to give the substantially pure bis(m-trifluoromethylphenyl) N-ethyl - N - (m-trifluoromethyl)-benzylphosphoramidate, B.P. 166° C./0.03 mm., $n_D^{25}$ 1.4785, and analyzing as follows:

Calc'd for $C_{24}H_{19}F_9NO_3P$: C, 51.25%; H, 3.41%; N, 2.49%. Found: C, 51.12%; H, 3.37%; N, 2.41%.

$P^{31}$ nuclear magnetic resonance analysis confirmed the structure.

The compound had an autogenous ignition temperature 1015° F. for .07 ml. with a lag of seven seconds. It had a flash point of 486° F. and did not fire at the maximum test temperature of 725° F.

*Example 7*

To about 3 moles of methylamine in an equal volume of ether there was added an ether solution of 0.185 mole of 5,5,6,6,7,7,7-heptafluoroheptyl iodide. After standing for about 6 hours under a Dry Ice reflux condenser, the methylamine was permitted to escape slowly as it warmed to room temperature. The residue was washed and dried and distilled to give the substantially pure N-methyl-5,5,6,6,7,7,7-heptafluoroheptylamine, B.P. 90° C./100 mm.

An ether solution of 60.6 g. (0.15 mole) of bis(m-trifluoromethylphenyl) phosphorochloridate, prepared as described in Example 1, was slowly added to an ice-cooled solution consisting of 38.2 g. (0.15 mole) of the above prepared N - methyl-5,5,6,6,7,7,7-heptafluoroheptylamine and 30 g. (0.3 mole) of triethylamine dissolved in ether. The whole was then stirred at reflux for 2 hours and then allowed to stand at room temperature for about 3 days. The solid by-product triethylamine hydrochloride (20.5 g.; theory, 20.6 g.) was filtered off, and the filtrate was washed three times with dilute hydrochloric acid and finally with salt water. Distillation of the washed filtrate gave 76.7 g. (87% theoretical yield) of the substantially pure bis(m-trifluoromethylphenyl) N-(5,5,6,6,7,7,7-heptafluoroheptyl)-N-methylphosphoramidate, B.P. 160° C./0.2 mm. Redistillation gave the purer product, B.P. 140° C./0.05 mm., $n_D^{25}$ 1.4312, and analyzing as follows:

Calc'd for $C_{22}H_{19}F_{13}NO_3P$: C, 42.39%; H, 3.07%; F, 39.62%. Found: C, 42.92%; H, 2.72%; F, 40.12%.

The compound was found to have a pour point of −20° F., and the following kinematic viscosities were determined at the temperatures shown below:

| ° F.: | Centistokes |
|---|---|
| 25 | 1440 |
| 100 | 34.92 |
| 210 | 3.97 |

The ASTM slope was 0.99 over the 25° to 210° F. range.

The autogenous ignition temperature was found to be 960° F. for 0.07 ml. with a lag of 2 seconds. The compound did not ignite in the 1300° F. molten metal test unless a spark was applied and then it was self-extinguishing. The flash point was 470° F. and no fire point was observed to the maximum temperature of 690° F.

In the paint compatibility test, there was no evidence of attack upon the paint at the end of ten days, at which time observation was discontinued.

Instead of containing only one of the presently provided fluorine-containing phosphoramidates, the operative fluid of the present hydraulic systems and methods may be a mixture of said amidates, say, a mixture of isomeric bis(trifluoromethylphenyl) N-ethyl-n-(2,2,2-trifluoroethyl)phosphoramidates. In some instances it will be found that compounds having meta- and/or ortho-substitution at the phenyl nucleus possess fluidity than do the para-substituted compounds. Hence, the choice of compound may depend upon the environment in which the hydraulic pressure device is to be employed. The presently provided phosphoramidates may also be mixed with known hydraulic fluids, e.g., the trialkyl phosphates or the dialkyl arylphosphonates or the aromatic polyethers, so long as the properties of the resulting mixture meet the specifications required of a hydraulic fluid for the intended use. Obviously, if the contemplated use places no limitation on such factors as either low- or high-temperature behavior or paint compatibility; or if no fire-hazard exists, the present compounds may be used in any proportion. However, if one or more of these factors is important, then care should be observed in preventing an undesired extent of dilution. Generally, at least a major component of the mixture should be said phosphoramidate.

Also, the usual fluid additives, e.g., corrosion inhibitors, antioxidants, viscosity-index improvers, etc., may be added to the present phosphoramidates, although for most purposes it will be found that such additives can be dispensed with.

It is to be understood that although the invention has been described with specific reference to particular embodiments thereof, it is not to be so limited since changes and alterations therein may be made which are within the full intended scope of this invention as defined by the appended claims.

What we claim is:

1. The compound of the formula

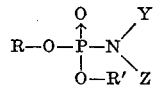

wherein R is (perfluoroalkyl)phenyl- having from 1 to 3 carbon atoms in the alkyl, R' is selected from the class consisting of R and halophenyl-, Y is a fluorine-containing radical selected from the class consisting of the radical

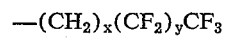

where $x$ is 1 to 4 and $y$ is 0 to 5 and the radical

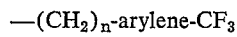

where $n$ is 0 to 2 and the arylene radical is a bivalent benzenoid radical containing 6 to 8 carbon atoms and being linked through nuclear carbon to the remainder of the molecule, and Z is selected from the class consisting of Y and alkyl- of from 1 to 4 carbon atoms.

2. The compound of the formula

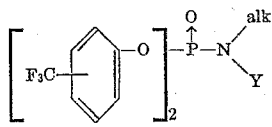

wherein alk denotes an alkyl radical of from 1 to 4 carbon atoms and Y is a fluorine-containing radical selected from the class consisting of the radical $$-(CH_2)_x(CF_2)_yCF_3$$

where $x$ is 1 to 4 and $y$ is 0 to 5 and the radical $$-(CH_2)_n\text{-arylene-}CF_3$$

where $n$ is 0 to 2 and the arylene radical is a bivalent benzenoid radical containing 6 to 8 carbon atoms and being linked through nuclear carbon to the remainder of the molecule.

3. The compound of the formula

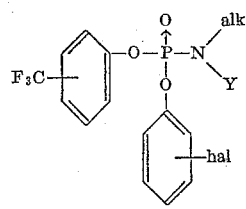

where hal denotes halogen, alk denotes an alkyl radical of from 1 to 4 carbon atoms and Y is a fluorine-containing radical selected from the class consisting of the radical $$-(CH_2)_x(CF_2)_yCF_3$$

where $x$ is 1 to 4 and $y$ is 0 to 5 and the radical $$-(CH_2)_n\text{-arylene-}CF_3$$

where $n$ is 0 to 2 and the arylene radical is a bivalent benzenoid radical containing 6 to 8 carbon atoms and being linked through nuclear carbon to the remainder of the molecule.

4. Bis(m-trifluoromethyl)phenyl N-(2,2,3,3,4,4,4-heptafluorobutyl)-N-methylphosphoramidate.

5. m-Chlorophenyl m-trifluoromethylphenyl N-(2,2,3,3,4,4,4-heptafluorobutyl)-N-methylphosphoramidate.

6. Bis(m-trifluoromethylphenyl) N-ethyl-N-(m-trifluoromethylphenyl)phosphoramidate.

7. Bis(m-trifluoromethylphenyl) N-ethyl-N-(m-trifluoromethyl)benzylphosphoramidate.

8. Bis(m-trifluoromethylphenyl) N-(5,5,6,6,7,7,7-heptafluoroheptyl)-N-methylphosphoramidate.

References Cited
UNITED STATES PATENTS
2,385,713  9/1945  Kosolapoff _____ 260—984 X CHARLES B. PARKER, Primary Examiner.
A. H. SUTTO, Assistant Examiner.